United States Patent [19]
Takahashi

[11] Patent Number: 5,685,795
[45] Date of Patent: Nov. 11, 1997

[54] DIFFERENTIAL

[75] Inventor: Satoshi Takahashi, Saitama-ken, Japan

[73] Assignee: Zexel Corporation, Tokyo, Japan

[21] Appl. No.: 658,263

[22] Filed: Jun. 5, 1996

[30] Foreign Application Priority Data

Jun. 23, 1995 [JP] Japan ................................. 7-181116

[51] Int. Cl.$^6$ .................................................. F16H 1/28
[52] U.S. Cl. ........................... 475/252; 475/331; 475/248
[58] Field of Search ................................. 475/252, 248, 475/331, 338, 249

[56] References Cited

U.S. PATENT DOCUMENTS

| | | | |
|---|---|---|---|
| 5,194,054 | 3/1993 | Amborn et al. | 475/249 |
| 5,194,058 | 3/1993 | Amborn et al. | 475/249 X |
| 5,415,601 | 5/1995 | Cilano | 475/248 X |
| 5,433,673 | 7/1995 | Cilano | 475/252 |
| 5,462,497 | 10/1995 | Cilano | 475/252 |
| 5,529,547 | 6/1996 | Okuda et al. | 475/252 X |

FOREIGN PATENT DOCUMENTS

WO 94/29615  12/1994  WIPO.

*Primary Examiner*—Charles A. Marmor
*Assistant Examiner*—Peter T. Kwon
*Attorney, Agent, or Firm*—Fish & Richardson P.C.

[57] ABSTRACT

A first and a second center washer are interposed between a pair of sun gears received within a housing. A first engagement portion comprising a pair of planetary gears, etc. is disposed on an internal side of the housing. Second engagement portions such as projections, etc. to be engaged with the first engagement portion through a space for play are formed on the two center washers, respectively. One surface of the first center washer is in contact with one surface of the second center washer. The other surface of the first center washer is in contact with an end face of one of the pair of sun gears, whereas the other surface of the second center washer is in contact with an end face of the other sun gear.

5 Claims, 3 Drawing Sheets

DIFFERENTIAL

BACKGROUND OF THE INVENTION

This invention relates to a differential having center washers arranged between one pair of sun gears.

A differential used for automotive vehicles, for example, includes a housing which can be rotationally driven, a pair of sun gears disposed within the housing, and plural pairs of planetary gears which are in engagement not only with the pair of sun gears but also with each other. As known, a center washer is disposed between the pair of sun gears.

In a differential disclosed in International Disclosure WO94/29615, a center washer includes a plurality of projections (second engagement portions) projecting radially outwardly. The center washer is prevented from rotating relative to the housing by its projections being inserted between shank portions (first engagement portions) of corresponding pairs of planetary gears. Because of this arrangement, friction occurs not only between one side surface of the center washer and one of the sun gears but also between the other side surface of the center washer and the other sun gear. With this construction, the speed of relative rotation between each side surface of the center washer and the corresponding sun gear which contacts each side surface of the center washer is equal to the speed of relative rotation between the corresponding sun gear and the housing and about a half of the speed of relative rotation between the pair of sun gears. Accordingly, theoretically to speak, load attributable to friction on each side surface of the center washer is reduced and the possibility of occurrence of wear too soon is reduced.

However, in the differential according to the teaching of the above disclosure, load to each side surface of the center washer is, actually, not reduced to the extent of full satisfaction. The reasons will be described hereinafter in detail.

The projections of the center washer are inserted between the shanks of each pair of the planetary gears through a small space for play. Accordingly, the center washer can rotate relative to the housing to the extent of this space for play. During the differentiating operation, the projections of the center washer receive mutually opposite rotary torque from the pair of sun gears which are in contact with opposite side surfaces of the center washer. In case the rotary torque rendered from one of the sun gears is larger, the center washer is stopped relative to the housing because the projections are brought into contact or abutment with one of each pair of planetary gears. In contrast, in case the rotary torque coming from the other sun gear is larger, the center washer is stopped relative to the housing because each of the projections of the center washer is brought into abutment with the other of each pair of planetary gears. When the center washer is in the stop position relative to the housing, since the pair of sun gears rotate relative to the opposite side surfaces of the center washer, load attributable to friction at each side surface of the center washer is reduced.

However, when larger rotary torque coming from one of the pair of sun gears to act on the center washer becomes smaller compared with that from the other sun gear or vice versa, the center washer rotates relative to the housing to the extent of the space for play, together with the sun gear which renders the larger rotary torque. At that time, the center washer rotates relative to the sun gear which renders the smaller rotary torque, and the speed of relative rotation therebetween is equal to the speed of relative rotation between the pair of sun gears. For this reason, at the side surface of the center washer which contacts the smaller rotary torque, load attributable to friction is about twice of that when the center washer is in the stop position relative to the housing. Actually, since it frequently occurs that larger rotary toque coming from one of the sun gears becomes smaller than that from the other sun gear or vice versa, rotation of the center washer relative to the housing occurs frequently. Accordingly, the load attributable to friction is not reduced sufficiently enough at the side surfaces of the center washer and the problem of occurrence of wear too soon remains unsolved.

It should be noted that them is a U.S. patent application Ser. No. 08/404,633 (DE Patent Application No. 19512807.9) prior to the filing of the present application.

SUMMARY OF THE INVENTION

It is, therefore, an object of the present invention to provide a differential, in which the dimension can be minimized and center washers can be prevented from being worn too soon.

According to the present invention, there is provided a differential comprising:
 (a) a housing rotationally driven about a rotational axis, a first engagement portion being formed on an internal side of the housing;
 (b) a pair of sun gears rotatably received within the housing in a manner coaxial with the rotational axis;
 (c) at least one pair of planetary gears rotatably disposed within the housing, the planetary gears being in engagement not only with the pair of sun gears but also with each other; and
 (d) a first and a second center washer disposed between the pair of sun gears, one surface of the first center washer being in contact with one surface of the second center washer, the other surface of the first center washer being in contact with an end face of one of the pair of sun gears and the other surface of the second center washer being in contact with an end face of the other sun gear, the first and second center washers each having a basal portion and a second engagement portion formed at a peripheral edge of the basal portion, the second engagement portion being in engagement with the first engagement portion through a space for play.

DETAILED DESCRIPTION OF THE INVENTION

Figure 1:
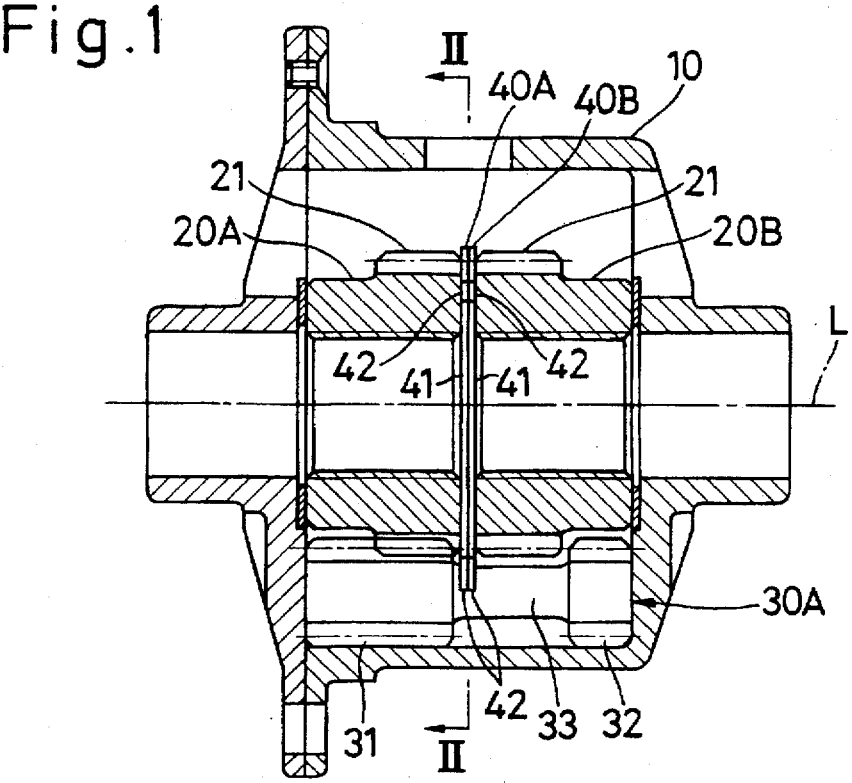
FIG. 1 is a sectional view showing a differential according to the first embodiment of the present invention and is a sectional view taken on line I—I of FIG. 2.
Figure 2:
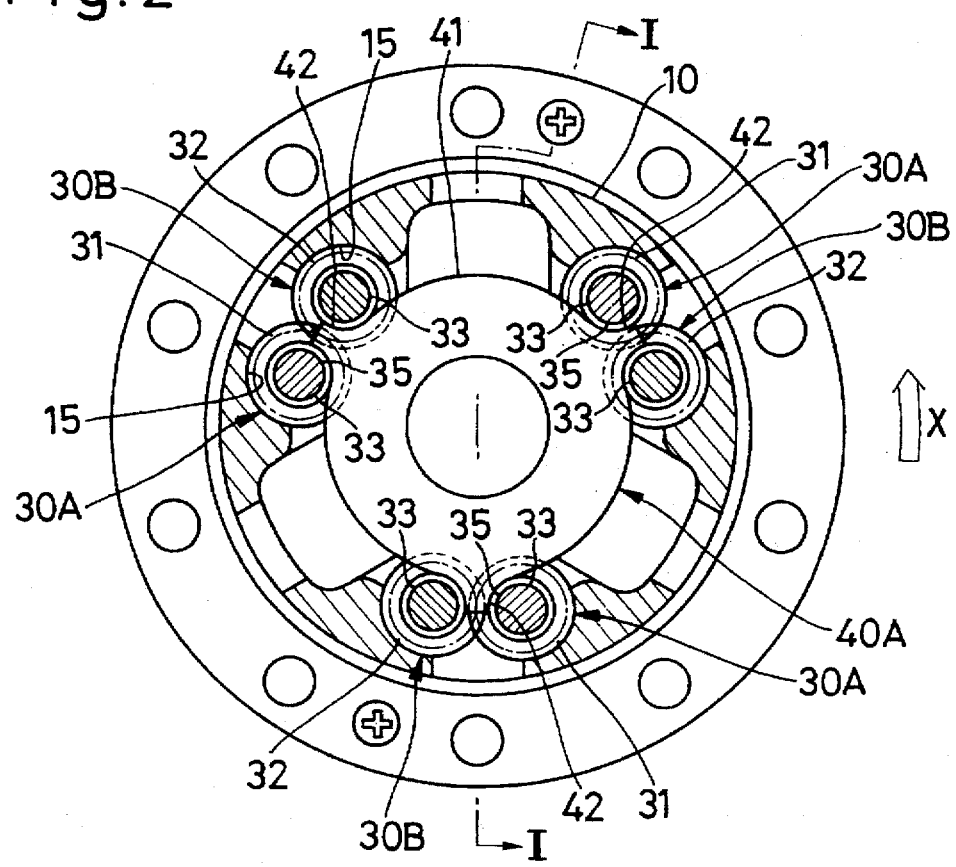
FIG. 2 is a sectional view showing the above differential and is a sectional view taken on line II—II of FIG. 1.
Figure 3:
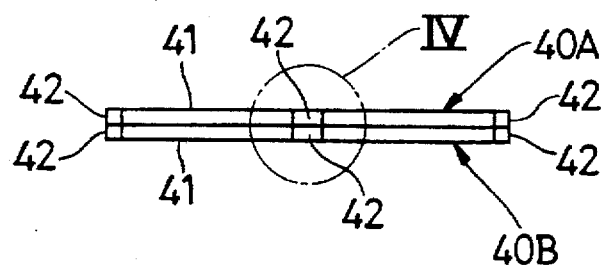
FIG. 3 is a bottom view showing a pair of center washers in the above differential.
Figure 4:
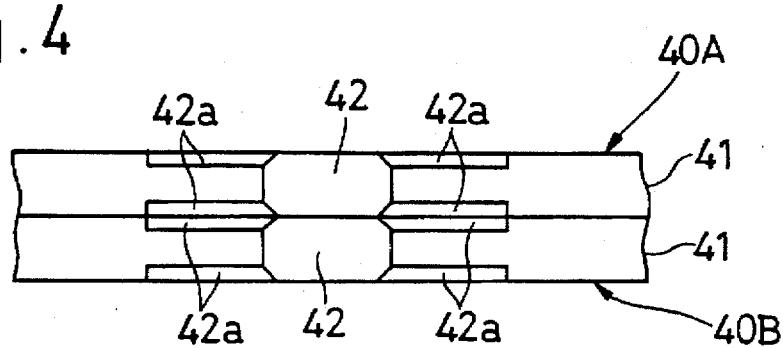
FIG. 4 is an enlarged bottom view of a portion indicated by IV of FIG. 3.

A differential according to the first embodiment of the present invention will now be described with reference to FIGS. 1 through 7. This differential is used, for example, for automotive vehicles. As shown in FIGS. 1 and 2, the differential includes a housing 10. The housing 10 is rotationally driven about a rotational axis L by rotational torque coming from an engine. A pair of sun gears 20A, 20B are rotatably received in the housing 10 in a manner coaxial with the rotational axis L. Helical teeth 21 are formed on the sun gears 20A, 20B, respectively. One ends of a pair of output shafts (not shown) coaxial with the rotational axis L are spline connected to the sun gears 20A, 20B, respectively.

Within the housing 10, at least one pair (for example, three pairs) of planetary gears 30A, 30B (first engagement portions) each having an axis parallel to the rotational axis L are equally spacedly arranged in a circumferential direction. These planetary gears 30A, 30B are rotatably received in a receiving recess 15 which is formed in an internal peripheral surface of the housing 10. Each receiving recess 15 has a semi-circular configuration in section and extends in parallel with the rotational axis L.

The paired planetary gears 30A, 30B are provided with long helical teeth 31, short helical teeth 32 and shank portions 33 (areas where no helical tooth is formed) formed between the teeth 31 and 32., respectively.

The long helical teeth 31 of the planetary gears 30A are in engagement with the helical teeth 21 of the sun gear 20A, and also with the short helical teeth 32 of the planetary gears 30B. The long helical teeth 31 of the planetary gears 30B are in engagement with the helical teeth 21 of the sun gear 20B and also with the short helical teeth 32 of the planetary gears 30A.

Figure 5:
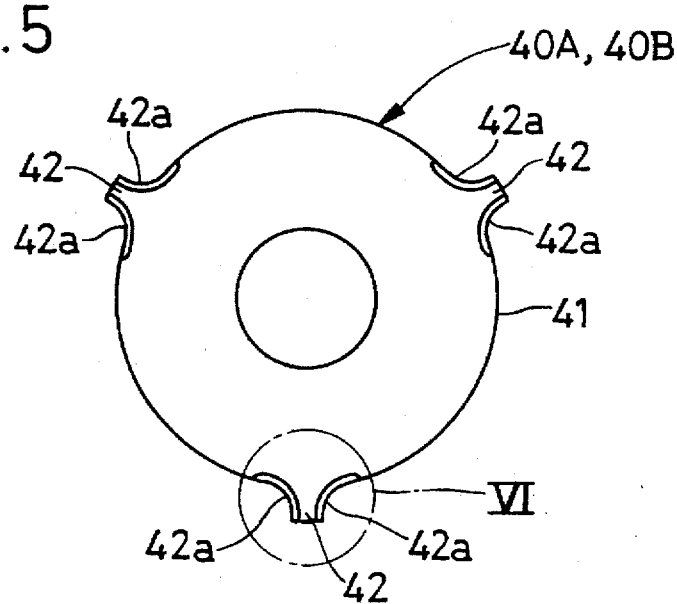
FIG. 5 is a front view of one of the above pair of center washers.
Figure 6:
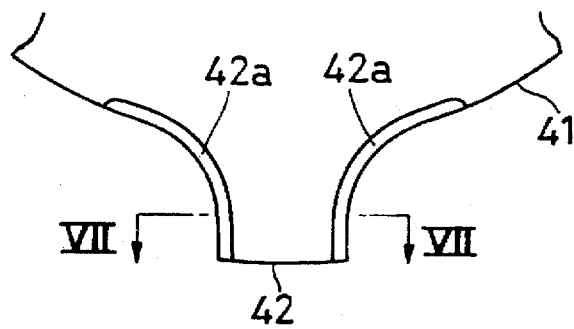
FIG. 6 is an enlarged front view of a portion indicated by VI of FIG. 5.
Figure 7:
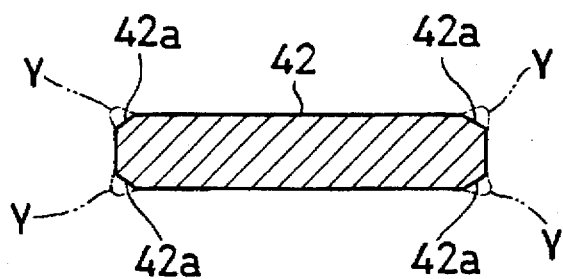
FIG. 7 is an enlarged sectional view of a projection of the center washer taken on line VII—VII of FIG. 6.

Between the pair of sun gears 20A and 20B, a first and a second center washer 40A, 40B are disposed. One side surfaces of the center washers 40A, 40B are in contact with each other. The other side surface of the first center washer 40A is in contact with an end face of the sun gear 20A, whereas the other side surface of the second center washer 40B is in contact with an end face of the sun gear 20B. The center washer 40A, 40B are of the same configuration. As shown in FIG. 5, each of the center washers 40A, 40B has a circular basal portion 41 and three projections 42 (second engagement portions) equally spacedly arranged in a circumferential direction of the basal portion 41 and projecting radially outwardly from a peripheral edge of the basal portion 41.

As shown in FIG. 2, the projections 42 are inserted respectively into receiving spaces 35 between the shank portions 33 of the paired planetary gears 30A, 30B. The center washers 40A, 40B are prohibited from rotating relative to the housing 10 by opposite side edges (opposite side edges in the circumferential direction of the basal portion 41 ) of the projections 42 being in abutment with the planetary gears 30A, 30B, and are allowed to rotate together with the housing 2. In order to avoid the possibility of unableness for attaching the center washers 40A, 40B due to manufacturing errors and the like, a circumferential width of each projection 42 is designed to be slightly smaller than an interval between the shank portions 33 of the planetary gears 30A, 30B and therefore, some space for play exists between the projection 42 and the shank portions 33. Accordingly, the center washers 40A, 40B can rotate relative to the housing 10 to the extent of the space for play. In FIG. 2, this space for play is illustrated in an exaggerated manner.

Circumferential locations of the three projections 42 of the two center washers 40A, 40B are coincident with each other. In other words, the three projections 42 of the two center washers 40A, 40B are axially aligned with each other.

As shown in FIGS. 4 through 7, opposite side surfaces of the center washers 40A, 40B are formed respectively with chamfering 42a at opposite side edges of each projection 42. The chamfering 42a may be formed only on opposing side surfaces of the center washers 40A, 40B which are in contact with each other.

In the differential thus constructed, the center washers 40A, 40B are held in their stop positions relative to the housing 10 when they receive opposite rotary torque respectively from the corresponding sun gears 20A, 20B during the differentiating operation.

More specifically, when the vehicle runs forwardly, the housing 10 rotates in a direction as shown by an arrow X of FIG. 2. When the vehicle turns rightwardly to bring the differential into a differentiating condition, the sun gear 20A rotates at a higher speed than the housing 10 and in the direction of the arrow X relative to the housing 10. At that time, the other sun gear 20B rotates at a lower speed than the housing 10 and in an opposite direction to the direction of the arrow X relative to the housing 10. In that state, since the center washer 40A receives rotary torque from the sun gear 20A, its projection 42 is brought into abutment with the planetary gear 30A thus causing the first center washer 40A to stop relative to the housing 10. On the other hand, since the second center washer 40B receives rotary torque for rotation in the opposite direction from the other sun gear 20B, its projection 42 is brought into abutment with the other planetary gear 30B thus causing the second center washer 40B to stop relative to the housing 10.

When the center washers 40A, 40B are in their stop positions relative to the housing 10, the relative rotational speed between the center washer 40A and the sun gear 20A and the relative rotational speed between the center washer 40B and the sun gear 20B are equal respectively to the relative rotational speeds between the sun gears 20A, 20B and the housing 10, and about a half of the relative speed between the sun gears 20A and 20B on average, thus enabling to reduce the load due to friction on the side surfaces of the center washers 40A, 40B. Moreover, the center washers 40A, 40B are held in their stop positions relative to the housing 10 as long as the differentiating state caused by rightward turning of the vehicle continues and are not affected by fluctuation of the rotary torque transmitted to the center washers 40A, 40B from the sun gears 20A, 20B. As a consequence, the number of rotation of the center washers 40a, 40B relative to the housing 10 is significantly reduced to prevent wear from occurring too soon.

When the vehicle turns leftwardly to vary the above differentiating state, contrary to the above, the projections 42 of the first center washer 40A are brought into contact with the planetary gears 30B and the projections 42 of the second center washer 40B to the planetary gears 30A. Consequently, the center washers 40A, 40B are stopped relative to the housing 10.

As previously discussed, every time the differentiating state varies, the projection 42 is brought into abutment with the planetary gears 30A, 30B. Because of this, presuming that there is no provision of the chamfering 42a, there is the possibility that the projection 42 projects in a direction of its width due to deformation of opposite side edges of the projection 42. Deformations of the opposite side edges of the projection 42 are indicated by imaginary lines Y of FIG. 7.

However, since there is a provision of the chamfering 42a in this embodiment, such deformations can be prevented. Accordingly, hot seize of the center washers 40A, 40B, which would otherwise occur due to interference between the deformed portions of the projections 42 of the center washers 40A, 40B, can be prevented from occurrence.

Figure 8:
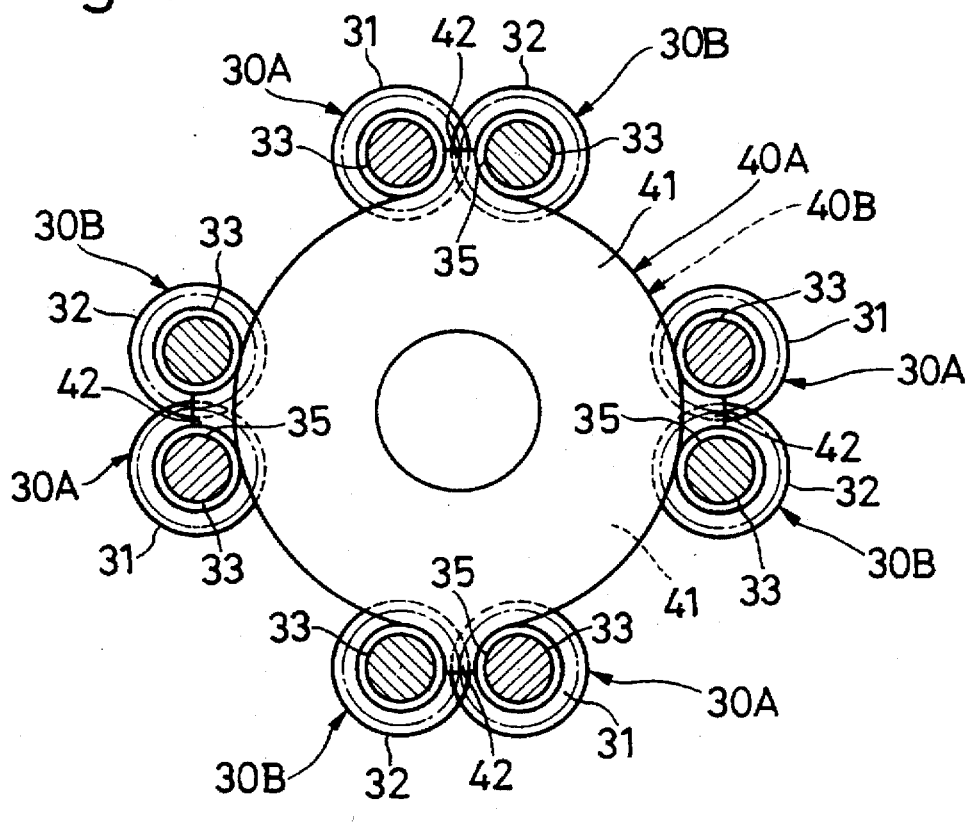
FIG. 8 is a view, like FIG. 2, showing a differential according to the second embodiment of the present invention, but in which a housing is omitted.
Figure 9:
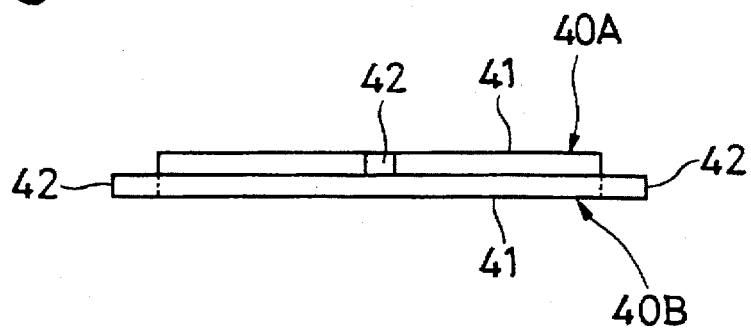
FIG. 9 is a bottom view of a pair of center washers according to the second embodiment of the present invention.

FIGS. 8 and 9 show a differential according to the second embodiment of the present invention. In this embodiment, component parts corresponding to those of the first embodiment are denoted by identical reference numeral and description thereof is omitted. In this embodiment, four pairs of the planetary gears 30A, 30B are equally spacedly arranged in the circumferential direction. The arrangement is the same as the first embodiment in the respect that a first and a second center washer 40A, 40B are interposed between one pair of sun gears. Each of the center washers 40A, 40B is provided with, 40 projections 42. In each of the center washers 40A, 40B, the two projections 42 are arranged with an interval of 180 degrees in the circumferential direction. The projections 42 of the first center washer 40A are spacedly arranged with an interval of 90 degrees with respect to the projections 42 of the second center washers 40B, respectively. The total four projections 42 of the pair of center washers 40A, 40B are inserted between corresponding four pairs of planetary gears 30A, 30B, respectively. Owing to this arrangement, although each projection 42 is deformed by being abutted with the corresponding planetary gears 30A, 30B, no hot seize occurs therebetween because the projections 42 of the first center washer 40A are away from the projections 42 of the second center washer 40B and not interfered with each other.

The present invention should not be limited to the above embodiments but many changes can be made in accordance with necessary.

For example, in the above embodiments, the projections 42 of the center washers 40A, 40B are inserted respectively between corresponding pairs of planetary gears 30A and 30B. It is an interesting alternative that recesses (first engagement portions) are formed in the housing 10 so that the projections 42 are inserted into corresponding recesses. It is also an interesting alternative that recesses (second engagement portions) are formed in the center washers and projections (first engagement portions) to be received in corresponding recesses are formed in the housing.

What is claimed is:

1. A differential comprising:
   (a) a housing rotationally driven about a rotational axis, a first engagement portion being formed on an internal side of said housing;
   (b) a pair of sun gears rotatably received within said housing in a manner coaxial with said rotational axis;
   (c) at least one pair of planetary gears rotatably disposed within said housing, said planetary gears being in engagement not only with said pair of sun gears but also with each other; and
   (d) a first and a second center washer disposed between said pair of sun gears, one surface of said first center washer being in contact with one surface of said second center washer, the other surface of said first center washer being in contact with an end face of one of said pair of sun gears and the other surface of said second center washer being in contact with an end face of the other sun gear, said first and second center washers each having a basal portion and a second engagement portion formed at a peripheral edge of said basal portion, said second engagement portion being in engagement with said first engagement portion through a space for play;
   wherein said second engagement portions of said first and second center washers are axially aligned with each other, the first-mentioned mutually contacting surfaces of said first and second center washers being chamfered at circumferentially opposite side edges thereof.

2. A differential comprising:
   (a) a housing rotationally driven about a rotational axis, a first engagement portion being formed on an internal side of said housing;
   (b) a pair of sun gears rotatably received within said housing in a manner coaxial with said rotational axis;
   (c) at least one pair of planetary gears rotatably disposed within said housing, said planetary gears being in engagement not only with said pair of sun gears but also with each other; and
   (d) a first and a second center washer disposed between said pair of sun gears, one surface of said first center washer being in contact with one surface of said second center washer, the other surface of said first center washer being in contact with an end face of one of said pair of sun gears and the other surface of said second center washer being in contact with an end face of the other sun gear, said first and second center washers each having a basal portion and a second engagement portion formed at a peripheral edge of said basal portion, said second engagement portion being in engagement with said first engagement portion through a space for play;
   wherein a plurality of said first engagement portions are spacedly arranged in a circumferential direction of said housing, and said second engagement portion of said first center washer is circumferentially spaced away from said second engagement portion of said second center washer so that said second engagement portion of said first center washer and said second engagement portion of said second center washer are engaged with mutually different first engagement portions.

3. A differential according to claim 1 or 2, wherein said second engagement portion includes a projection projecting radially outwardly from said basal portion, and said first engagement portion includes a receiving space for receiving said projection.

4. A differential according to claim 3, wherein said first engagement portion includes said pair of planetary gears, and a space between said pair of planetary gears is provided as said receiving space.

5. A differential according to claim 2, wherein four pairs of said planetary gears are equally spacedly arranged in the circumferential direction and each pair of said planetary gears provides said first engagement portion, each of said first and second center washers having two second engagement portions arranged thereon with an interval of 180 degrees in the circumferential direction, each of said second engagement portions including a projection projecting radially outwardly, said two projections of said first center washer being inserted respectively between first two pairs of said planetary gears and said two projections of said second center washer being inserted respectively between the remaining two pairs of said planetary gears.

* * * * *